(12) United States Patent
Olschewski et al.

(10) Patent No.: US 7,120,281 B2
(45) Date of Patent: Oct. 10, 2006

(54) METHOD; MICROSCOPE SYSTEM AND SOFTWARE PROGRAM FOR THE OBSERVATION OF DYNAMIC PROCESSES

(75) Inventors: Frank Olschewski, Heldelberg (DE); Jochen Nickel, Mannheim (DE)

(73) Assignee: Leica Microsystems CMS GmbH,, Wetzlar (DE)

(*) Notice: Subject to any disclaimer, the term of this patent is extended or adjusted under 35 U.S.C. 154(b) by 748 days.

(21) Appl. No.: 10/222,037

(22) Filed: Aug. 16, 2002

(65) Prior Publication Data
US 2003/0044054 A1 Mar. 6, 2003

(30) Foreign Application Priority Data
Sep. 5, 2001 (DE) .............................. 101 43 441

(51) Int. Cl.
*G06K 9/00* (2006.01)
(52) U.S. Cl. ..................... 382/128; 382/173; 377/10
(58) Field of Classification Search ............... 382/103, 382/128, 129–134, 155, 168, 170–171, 178, 382/189, 209, 216, 218, 232, 246, 250, 255, 382/274, 276, 305; 324/750; 705/2; 372/173; 377/10
See application file for complete search history.

(56) References Cited

U.S. PATENT DOCUMENTS 5,257,182 A * 10/1993 Luck et al. ................. 382/224
5,978,498 A * 11/1999 Wilhelm et al. ............ 382/133
6,006,191 A * 12/1999 DiRienzo ........................ 705/2
6,462,345 B1 * 10/2002 Simon et al. ............ 250/458.1
6,509,750 B1 * 1/2003 Talbot et al. ................ 324/750
6,606,413 B1 * 8/2003 Zeineh ....................... 382/232
6,711,283 B1 * 3/2004 Soenksen .................... 382/133

FOREIGN PATENT DOCUMENTS

| DE | 692 01 377 | 9/1995 |
| EP | 0 945 867 | 9/1999 |
| WO | WO 96/09604 | 3/1996 |

OTHER PUBLICATIONS

Smith, Chen; Image and Video Indexing and Retrieval, in: Bovic (2000) Handbook of Image and Video Processing, Academic Press.

* cited by examiner

Primary Examiner—Jingge Wu
Assistant Examiner—Seyed Azarian
(74) Attorney, Agent, or Firm—Simpson & Simpson, PLLC

(57) ABSTRACT

A microscope system (4) for the observation of dynamic processes comprises a microscope (50) having at least one detector (19), and a computer (34). A buffer memory (54) precedes a comparator (58) that compares image contents of at least two successive image frames ($56_k$ and $56_{k+1}$). Depending on the result obtained from the comparator (58), the image frames are stored in different segments of a data structure (66) that is provided.

13 Claims, 3 Drawing Sheets

METHOD; MICROSCOPE SYSTEM AND SOFTWARE PROGRAM FOR THE OBSERVATION OF DYNAMIC PROCESSES

CROSS REFERENCE TO RELATED APPLICATIONS

This application claims priority of the German patent application 101 43 441.3 which is incorporated by reference herein.

FIELD OF THE INVENTION

The invention concerns a method for the observation of dynamic processes. The invention further concerns a microscope system for the observation of dynamic processes an the invention concerns a software program for the observation of dynamic processes.

BACKGROUND OF THE INVENTION

The coupling of an optical microscope to an image sensor and a computer system is existing art. This applies to the coupling of microscopes to CCD camera systems, video camera systems, and scanning microscopes (confocal, multi-photon, 4-pi). What is critical in these systems according to the existing art is the fact that the image sensor and computer system are coupled via a communication medium. Both the image sensor and the communication medium have a memorizing property that as a rule is expressed explicitly as a memory. This is explicitly the case in CCD cameras, where the CCD chip itself is constructed as a memory organized in rows and/or columns and, in the case of scanning microscopes, is integrated as RAM into the scanning electronics. In the context of the periodic recording of data (image frames), this can result in unnecessary filling of the memory with more or less redundant data; this has a limiting effect if the processing terminal cannot process that quantity of data quickly enough. This limitation is present in the existing art and is even more bothersome if little or nothing is happening in the scene or specimen being observed.

SUMMARY OF THE INVENTION

One object of this invention is to reduce redundancy in periodic data acquisitions. A further object of the invention is to increase the data transfer rate through the system by reducing redundancy.

The inherently homogeneous and usually equidistant data stream that occurs in periodic data acquisition and is supplied by a microscope system has similarities to processes and devices of video technology, and at an earlier time was also implemented by coupling a microscope, video camera, and video time-lapse recorder (VTR). A typical VTR that may still be in use today in microscopy generally operates with modifiable scanning times and an interactive interval control system. This existing art is sufficiently described in Inoué, Video Microscopy, Plenum Press. It should be mentioned that with this type of video microscopy the audio components expressed in video technology are generally left out of consideration, and are concurrently used at most for purposes of commentary by way of voice recordings, or to record sounds generated by the specimen itself. This concurrent use of the "sound track" is not given further consideration hereinafter, it being sufficiently clear to one skilled in the art that this is not a limitation of this invention but rather an optional expression.

Because of their superior 3D resolution, modern scanning microscopes (confocal, 4-pi) can perform volumetric image acquisitions in a periodic sequence. In this case, an entire volume takes over the role of the image in standard video technology, with no limitation of this invention in general. In this case the system generates a four-dimensional video. Modern spectrally adjustable detectors additionally exploit the wavelength as a scannable variable, resulting (in combination with scanning microscopes) in maximally five-dimensional videos. In that respect this method is to be regarded as dimensionless, since any desired actuators—which, depending on their location in the system, modify parameters such as illumination or the like—can be incorporated into the scanning process. This invention uses the word "video" for all data streams of this kind, regardless of dimensionality.

If such video sequences are regarded as a homogeneous serial arrangement of images, a large data set is then obtained. That set, however, breaks down into a natural tree-like hierarchy of parts. In video technology, the following terms for them have emerged (from Smith, Chen: Image and Video Indexing and Retrieving, in: Bovic (2000), Handbook of Image and Video Processing, Academic Press):

Video (image/sound) means a stream of images and audio data. "Audio" is of no interest in the present case. A scene is a sequential, "semantically coherent" set of images or image frames. An image frame is an individual image, and a segment (image/sound) is a set of scenes that are semantically coherent. In the generalization described here, the dimensionality of a frame is immaterial and could also be a volume.

This hierarchy is also found in numerous studio programs for hobbyist and professional filmmakers, in which individual scenes are recorded with a digital camera and then additionally processed, assembled into a segment, and lastly used—together with other segments—in a video. Let us take as a concrete example the scenes "murderer enters room" and "murderer murders," the segment "murder scene," and the final video "Scene of the Crime" (the names having been borrowed from German television broadcasts). Selection of the hierarchical levels (video, segment level 1, segment level 2, . . . , scene) can be made arbitrarily, since grouping into video, scene, segment is more or less performed by the viewer or the director by deliberate analysis. The core of the hierarchy-forming process is essentially the semantics defined, by synthesis, by the director. Modern production tools support this synthesis process with mechanisms such as a "storyboard," which displays the individual scenes as a graphical user interface, brings them into a logical sequence, and makes available a scene pool or database for managing individual scenes. These elements assist the filmmaker in his or her work, and are also used in modified form in this invention.

It is the object of the invention to create a method for efficient sensing of dynamic processes in microscopy. Efficient utilization of available memory space is necessary so that the quantity of data to be transferred in one unit of time can be reduced to the essential. This object is achieved by way of a method which comprises the steps of:

providing a microscope system with a processing unit associated with a detector;

controlling image capture of the microscope system with a computer;

acquiring and generating a plurality of image frames periodically;

processing image frames generated by the microscope with the computer;

storing the plurality of acquired image frames in a buffer memory;

conveying at least two successive subregions of successive image frames to a comparator; and segmenting of the image frames into sequences of sub-image frames in accordance with their image content.

A further object of the invention is to create a microscope system for efficient sensing of dynamic processes in microscopy. Efficient utilization of available memory space and system bandwidth is to be achieved, and the user is to be permitted rapid access to the dynamics of biological processes. The object is achieved by way of a microscope system comprising: a microscope having at least one detector, a computer, a buffer memory which precedes a comparator that compares the image contents of at least two successive image frames; and a data structure provided in the buffer memory wherein according to the result obtained from the comparator the image frames are stored in different segments of the buffer memory.

It is another object of the invention to provide a software program for efficient sensing of dynamic processes in microscopy. Efficient utilization of available memory space is necessary so that the quantity of data to be transferred in one unit of time can be reduced to the essential. This object is achieved by way of software program which is provided on a computer of a microscope system for the observation of dynamic processes, the software program:

controls image capture of the microscope system;

processes a plurality of image frames;

stores the plurality of acquired image frames in a buffer memory;

compares at least two successive subregions of successive image frames; and forms segments of the image frames into sequences of sub-image frames in accordance with their image content.

The invention has the advantage that it can be used in principle with any digitally image-producing microscope, telescope, video camera, or the like. In its present form, however, the invention should be applied only to microscopes.

Application of the invention to the example of confocal microscopy is particularly advantageous, although no particular limitation of the invention is to be seen therein.

When observing dynamic processes, an experimenter is often working into the unknown. This is true in particular, although without limitation as to generality, of applications in basic biological and medical research, in which the occasionally surprising behavior of living organisms is investigated. As a rule, the experimenter's approach is continuously to repeat a specific measurement at fixed time intervals. This encompasses repeated acquisition of individual points, repeated acquisition of individual lines, repeated acquisition of individual images, repeated acquisition of individual volumes, or repeated acquisition of individual hypervolumes (e.g. spectral scans), in which context spectral components may also be implicitly included, and the temporal aspect is characterized by a repetition that is controlled and monitored over time.

The essential advantage of the invention lies in a "modified" semantics specifically for microscopic specimens and processes. In addition, the director's synthesis is replaced by an automated analysis of a continuous data stream. The resulting microscope system will automatically group the individual frames into scenes, and will separate irrelevant from relevant scenes.

According to the invention, a CCD-based fluorescence microscope or a scanning microscope periodically performs acquisitions (of images, volumes, etc.). In this context, an individual acquired image is called an "image frame." The image frame is optionally smoothed. Using a special evaluation process, the image frame is then compared to the previous image frame from a buffer memory. If the result of the evaluation process is "similar," that frame is assigned to the current scene. If the evaluation process yields "dissimilar," the old scene is terminated and transferred into the memory of the linked computer. Optionally, the terminated scene is additionally processed in the computer system. The procedure is repeated at fixed time intervals.

This is particularly advantageous with time-lapse experiments in microscopy, since such experiments are a like a "shot in the dark." In 90 percent of all applications, it is necessary to wait (in some cases for days) for just a few events, and measurements must be made continuously, sometimes at high speed and/or high spatial (or spectral) resolution. A substantial disadvantage of the existing art, however, is the large quantities of data that occur with periodic repetition. The automated segmentation of the data stream into individual scenes, according to the present invention, allows this quantity of data to be decreased and reduced to its essentials.

By means of this segmentation, optionally followed by additional processing, the resolution during a time-lapse period can be dynamically adapted to the information content of the image frame. A less-detailed scene can thus be reduced to a few image points and stored in optimally coded fashion in the memories accessible to the computer (RAM, hard drive, Internet, removable media, linked network server).

Long scenes in which nothing is happening can be reduced to one frame. Sections with a linear illumination density fluctuation can be reduced to the first and last frame; the data from the reaction-free time can be reconstructed by linear interpolation. Dynamic scenes in which a lot is happening can be recorded with maximum time resolution. If something is happening in only relatively small portions of the image, the resolution can be limited to that portion.

The individual segments can be specially coded in the computer, yielding a drastic data reduction. The system furthermore becomes more ergonomic. According to the existing art, this kind of breakdown of the data stream must be defined before the experiment, but because no a priori knowledge is available, this requires a relatively large number of costly tests before an experimenter understands the specimen and its behavior over time. With the invention, everything can be measured and observed at maximum speed, and the user obtains the desired information directly. Hierarchical structures of this kind are also supported by multimedia data formats, such as MPEG. Depending on the complexity of the method, it can be integrated directly into the scanning electronics of each microscope system by way of FPGA or DSP structures. The method can be expanded to further dimensions (other than time) utilizing suitable criteria.

BRIEF DESCRIPTION OF THE DRAWINGS

The subject matter of the invention is depicted schematically in the drawings and will be described below with reference to the Figures, in which.

DETAILED DESCRIPTION OF THE INVENTION

Figure 1:
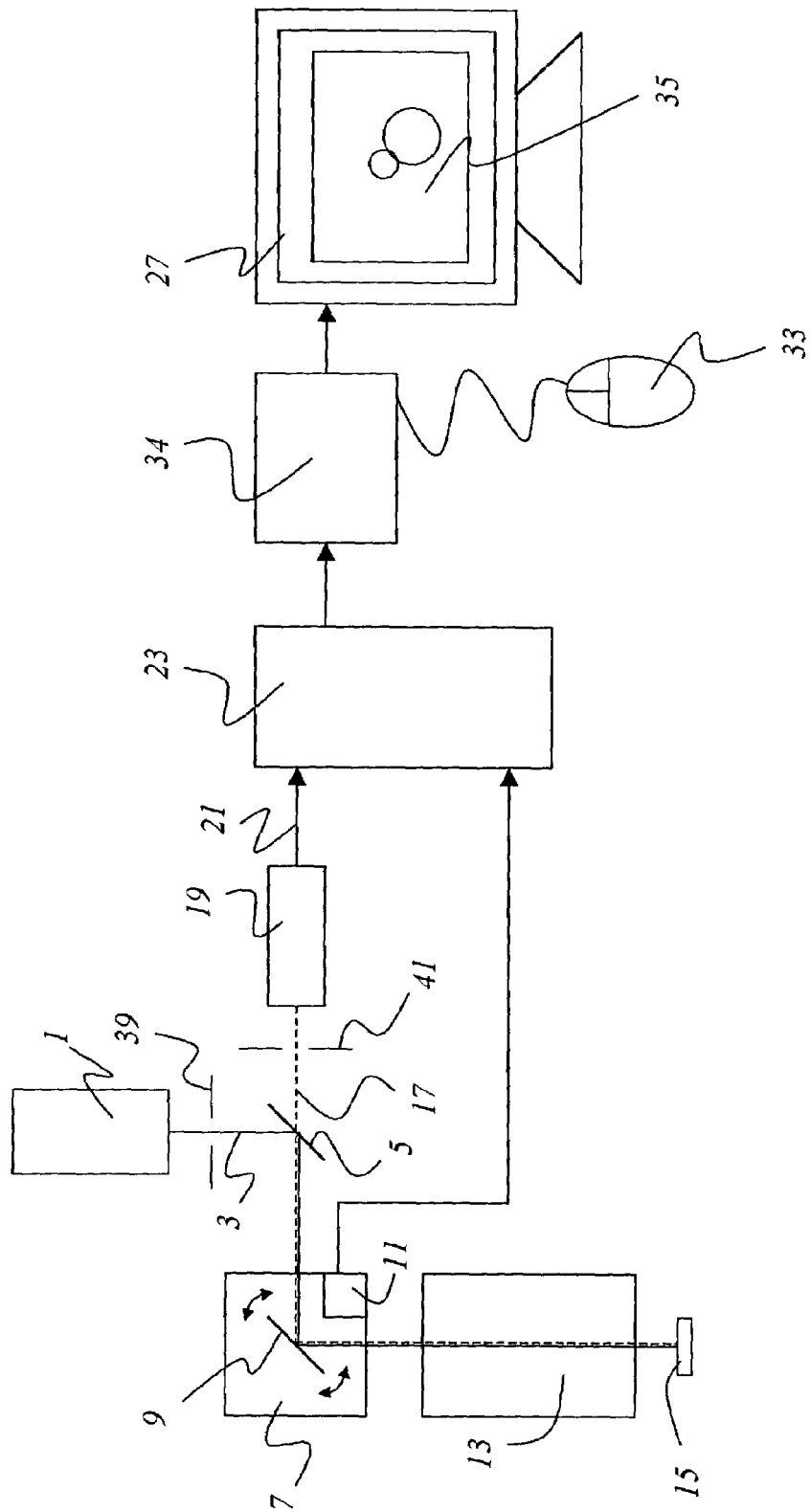
FIG. 1 schematically depicts a confocal scanning microscope.

FIG. 1 schematically shows a confocal scanning microscope. Light beam 3 coming from an illumination system 1 is reflected by a beam splitter 5 to scanning module 7, which contains a gimbal-mounted scanning mirror 9 that guides the beam through microscope optical system 13 over or through specimen 15. In the case of non-transparent specimens 15, light beam 3 is guided over the specimen surface. With biological specimens 15 (preparations) or transparent specimens, light beam 3 can also be guided through specimen 15. This means that different focal planes of specimen 15 are successively scanned by light beam 3. Subsequent assembly then yields a three-dimensional image of specimen 15. Light beam 3 coming from illumination system 1 is depicted as a solid line. Light 17 proceeding from specimen 15 travels through microscope optical system 13 and via scanning module 7 to beam splitter 5, passes through the latter and strikes detector 19, which is embodied as a photomultiplier or CCD sensor. Light 17 proceeding from specimen 15 is depicted as a dashed line. In detector 19, electrical detected signals 21 proportional to the power level of light 17 proceeding from specimen 15 are generated and forwarded to processing unit 23. Position signals 25 sensed in the scanning module with the aid of an inductively or capacitatively operating position sensor 11 are also transferred to processing unit 23. It is self-evident to one skilled in the art that the position of scanning mirror 9 can also be ascertained by way of the adjustment signals. The incoming analog signals are first digitized in processing unit 23. The signals are transferred to a computer 34 to which an input unit 33 is connected. The user can, with reference to processing of the data, make corresponding selections by means of input unit 33. In FIG. 1, a mouse is depicted as an input unit 33. It is self-evident to anyone skilled in the art, however, that a keyboard and the like can also be used as input unit 33. A display 27 depicts, for example, an image 35 of specimen 15. Illumination pinhole 39 and detection pinhole 41 that are usually provided in a confocal scanning microscope are schematically drawn in for the sake of completeness. Omitted in the interest of better clarity, however, are certain optical elements for guiding and shaping the light beams. These are sufficiently familiar to the person skilled in this art.

Figure 2:
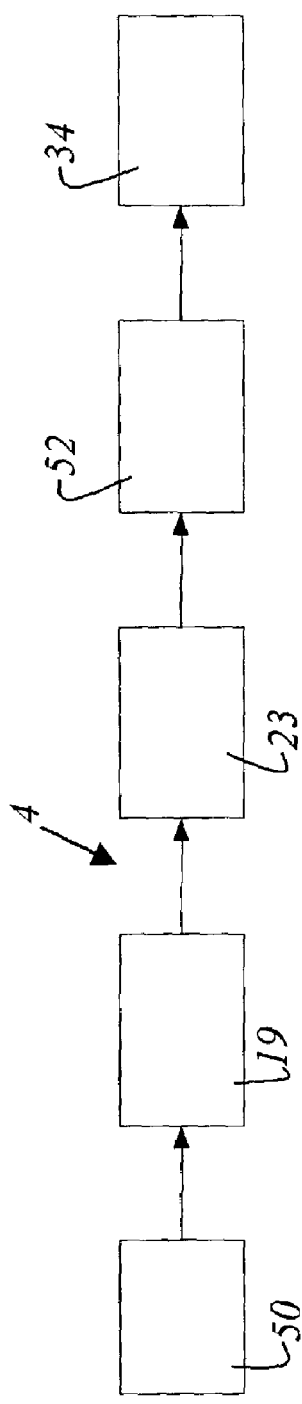
FIG. 2 is a block diagram of a microscope system for the observation of dynamic processes.

FIG. 2 depicts a block diagram of a microscope system 4 for the observation of dynamic processes. Microscope 50 of microscope system 4, which can be embodied e.g. as a scanning microscope, is connected to detector 19. In one embodiment, detector 19 can also be configured as a CCD sensor. In the case of a point-scanning microscope, at least one individual detector 19 is provided. This detector is then embodied as a photomultiplier. The signals of detector 19 are transferred in suitable fashion to processing unit 23. Processing unit 23 is embodied as a video segmenter and encoder. From processing unit 23, the acquired data travel via an interface 52 to computer 34. On display 27 depicted in FIG. 1, the image just acquired or the scenes automatically recorded by microscope system 4 are displayed for the user. It is important to ensure in this context that display occurs according to the user's settings or criteria. The video segmenter requires these parameters in order to implement the essential core idea of a "modified" semantics especially for microscopic specimens and processes. The position signals and detected signals in toto constitute an image frame or a portion of an image frame. As already mentioned above, the description below refers to an example of confocal microscopy. As a rule, a measurement is continuously repeated at fixed time intervals.

Figure 3:
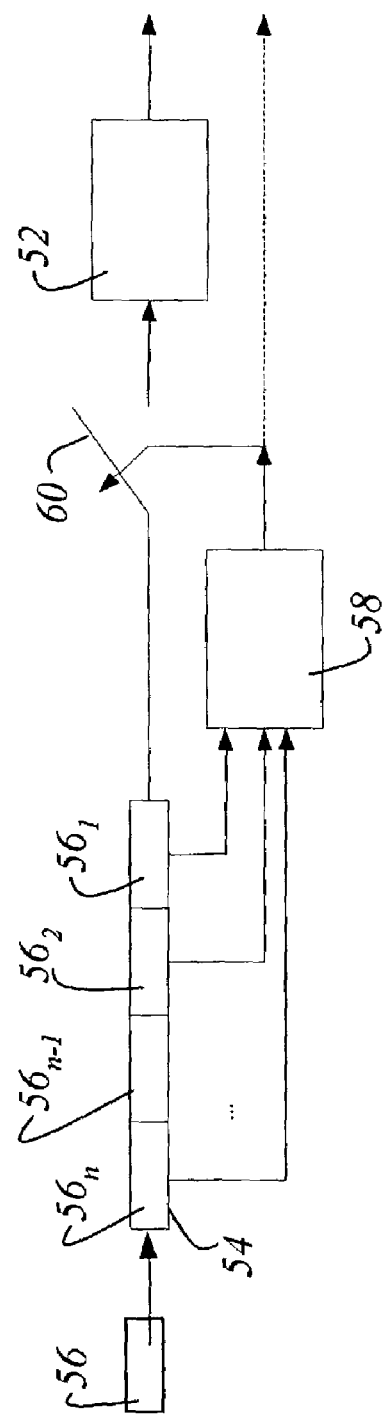
FIG. 3 schematically depicts the principle of a video segmenter.

FIG. 3 schematically depicts the principle of a video segmenter. In a CCD-based fluorescence microscope (i.e. a CCD camera is used as detector 19) or a scanning microscope (i.e. individual points are detected in succession), image acquisitions are performed periodically. In this context, acquired images are referred to as entire images, entire volumes, etc. An individual acquired image is hereinafter referred to as an image frame 56. Each image frame $56_1$, $56_2$, ... $56_n$ is conveyed to a buffer memory 54. Before a subsequent assessment or evaluation of the individual image frames $56_1$, $56_2$, ... $56_n$ is performed, at least two image frames $56_1$ and $56_2$ in succession must be stored in buffer memory 54. At least the first and second image frame $56_1$ and $56_2$ are conveyed to a comparator 58. Everyone skilled in the art knows that the number of images flowing into the comparator for assessment of the process must be at least two, but can be unlimited as to maximum. With an increasing number of image frames $56_1$, $56_2$, ... $56_n$ for the comparison process, mathematically smoother decision functions can be constructed, for example by selecting higher-order polynomial models. Buffer memory 54 and the number of inputs into comparator 58 are varied depending on the desired implementation. After comparator 58, image frames $56_1$, $56_2$, ... $56_n$ travel via a switch 60 to interface 52. As already described in FIG. 2, computer 34 is downstream from interface 52. In another exemplary embodiment of the invention, the decisions can additionally be passed from comparator 58 to computer 34. This alternative is depicted in FIG. 3 with a dotted line, and can simplify a concrete implementation.

For implementation of faster systems, the conventional design of the microscope system must be supplemented with a signal processor (FPGA, DSP, PC) and a RAM bank. The signal processor must perform the video segmentation. The RAM handles storage of the predecessor. The grouping of image frames into scenes and segments can always be handled by the control computer or computer 34. The graphical user interface of the control computer then contains new structures such as the storyboard, which now tells a story a posteriori about the "death of a cell" (a bad but common example from everyday life).

An embodiment of a microscope system according to the existing art is an unmodified microscope that implements a fast measured data stream in block fashion. It is also conceivable for the control computer to perform a video segmentation a posteriori, but this has definite disadvantages compared to a fast implementation according to the invention.

Figure 4:
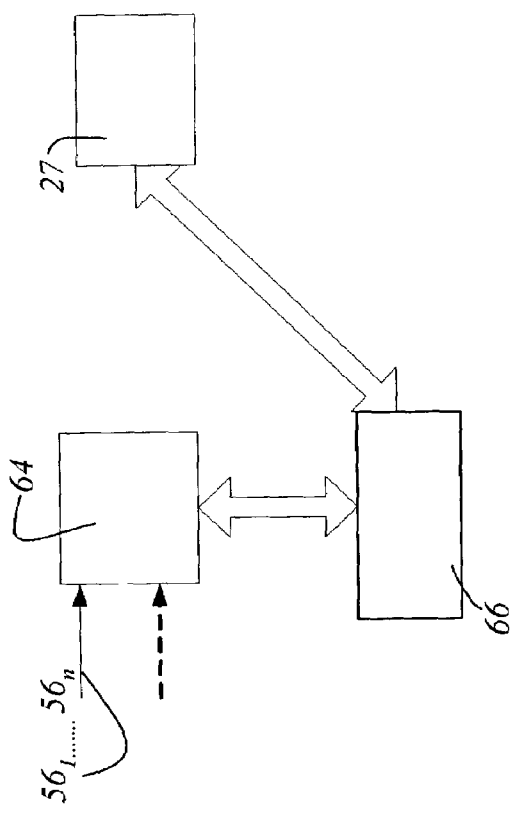
FIG. 4 schematically shows a decoder that can be implemented in PC software.

FIG. 4 shows a decoder that can be implemented schematically in PC software. The data acquired by microscope system 4 are conveyed to a data manager 64. Data manager 64 is responsible for performing an evaluation process. If the result of the evaluation process is "similar," that frame is then assigned to the current scene. The various scenes, whether "similar" or "dissimilar," are transferred into a structured data structure 66 that is usually expressed as a tree structure. Depending on the selection made by the user, the structured data structure can be conveyed to a display 27 for visual presentation.

Figure 5:
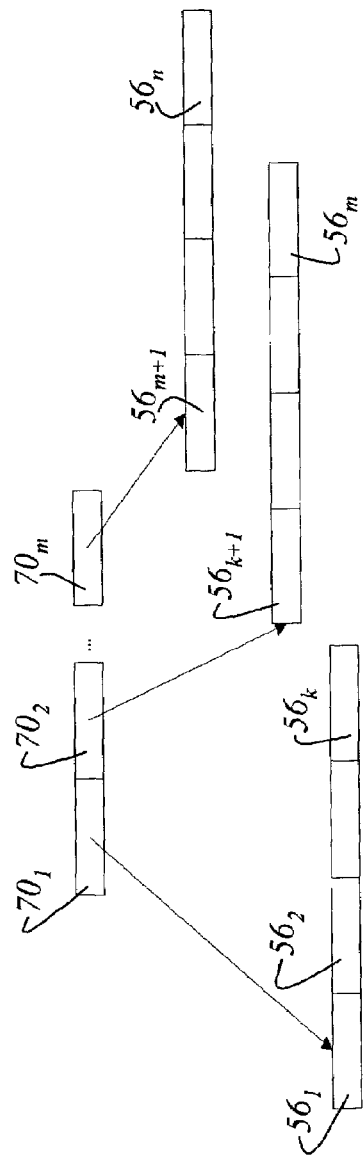
FIG. 5 depicts a hierarchical data structure in the associated memory.

FIG. 5 depicts a hierarchical data structure in the memory associated with detector 19. If the result yielded by the evaluation process is "dissimilar," the old scene is then terminated and is moved into the memory of the linked computer 34. A terminated scene can optionally be additionally processed. The operation of image acquisition or image frame recording is repeated at fixed time intervals. Time-lapse experiments in microscopy are like a "shot in the dark." 90 percent of all applications involve waiting for days for just a few events, and measurements must be made continuously, sometimes at high speed. Automatic segmentation of the data stream into individual scenes $70_1, 70_2, \ldots, 70_m$ allows this quantity of data to be reduced. In long scenes in which nothing is happening, for example, high data compression can be applied. Dynamic scenes in which a lot is happening can be recorded with maximum time resolution. The specific segments can be individually accessed in computer 34, resulting in a drastic data reduction with individual coding. The various scenes $70_1, 70_2, \ldots, 70_m$ are stored in different parts of data structure 66 and are directly accessible. As a result, the system becomes more ergonomic, available memory is limited to what is most essential, and attention is limited only to what is of interest. A data structure structured in this fashion also allows the user to navigate in nonlinear fashion through the stream of images. The user does not need to view every image in succession, but rather can jump directly into a scene that interests him or her. Hierarchical data structures of this kind are supported by multimedia formats such as MPEG.

Semantics of Biological and Microscopic Videos

By calculating various evaluations, it is possible to construct a decision tree that classifies individual image frame transitions and gives access to more detailed analysis. These evaluations are calculated in the video segmenter and are used to control the "cutter."

The simplest case—"nothing is happening"—never occurs in the real world and can be ignored.

The second-simplest case, on the other hand—"almost nothing is happening"—is the rule. In this case, noise is a changeable accompanying phenomenon. For this reason, an optional smoothing function was inserted into the configuration described above in order to remove noise-related variations. Standard image-processing methods can be applied here. Examples, with no limitation as to generality, are linear filters (Gauss, binomial, etc.), morphological filters (median, opening, closing, rank ordering filters), wavelet regression methods (also cited in the literature under the term "wavelet denoising").

A variety of dispersion metrics can be used to evaluate two images. The "sum of absolute differences"

$$D(t) = \sum_{i,j \in ROI} \|I_{(t)}(i,j) - I_{(t+T)}(i,j)\|$$

calculates, pixel by pixel, the distance between two images I at times t and t+T in a selected region or, as the limit case, in the entire image.

The "sum of absolute histogram differences,"

$$D(t) = \sum_{g} \|H_{(t)}(g) - H_{(t+T)}(g)\|$$

based on the images I at times t and t+T, calculates the histograms H at times t and t+T (by counting gray levels), and from them the distance.

With color images, this distance is calculated separately for each color channel, and an overall distance is then ascertained by averaging.

Alternatively, it is possible to quantify the motion within a scene using the "optical flux" of an image stream, which describes the most probable displacement of a pixel between the frames using a vector:

$$\vec{v}(x,y,t) = \begin{pmatrix} v_1(x,y,t) \\ v_2(x,y,t) \end{pmatrix}$$

This requires solving the Euler-Lagrange equation for the flux problem, defined by:

$$\lambda \nabla^2 v_1 = \left(\frac{\partial I}{\partial x}v_1 + \frac{\partial I}{\partial y}v_2 + \frac{\partial I}{\partial t}\right)\frac{\partial I}{\partial x},$$

$$\lambda \nabla^2 v_2 = \left(\frac{\partial I}{\partial x}v_1 + \frac{\partial I}{\partial y}v_2 + \frac{\partial I}{\partial t}\right)\frac{\partial I}{\partial y},$$

$$\nabla^2 = \frac{\partial^2}{\partial^2 x} + \frac{\partial^2}{\partial^2 y}$$

This elliptical partial differential equation can be satisfactorily solved, for example, iteratively by finite difference and finite element methods. Discrete approaches to a solution, which are advantageously suitable for implementation on a signal processor, also exist. If only certain types of motion (e.g., specimens moving linearly) are being looked for in a specific implementation, it is possible to derive even simpler determination equations and calculation algorithms by using motion equations.

Motions of specimens within the scene or sample then result in a change in the vector flux, and can be detected with the above-described distance metrics applied to images v1 and v2 at times t and t+T. These are sufficiently specified in recent research publications concerning video retrieval.

A further pragmatic variant consists in marking one or more cells in an overview image, which limits the system's attention to portions of the scene. In what is probably the most understandable variant for customers, a feature calculation is performed over these marked scene portions. A tolerance threshold is also defined for the feature; if exceeded, it results in the "dissimilar" classification. Examples of such features include the average intensity or the average intensity ratio between two channels. Changes in these features are at present used for quantification during offline analysis, and with this invention can be used at runtime as decision criteria from frame to frame. Segmentation performance levels could thus be set by defining a tolerance band for changes from frame to frame. "Triggers" of this kind are common, widespread, and well-understood, e.g., in physiology and oscilloscope practice.

The invention has been described with reference to a particular exemplary embodiment. It is self-evident, however, that changes and modifications can be made without thereby leaving the range of protection of the claims below.

PARTS LIST illumination system 1
light beam 3
microscope system 4
beam splitter 5
scanning module 7
scanning mirror 9
position sensor 11
microscope optical system 13
specimen 15
light 17
detector 19
electrical detected signals 21
processing unit 23
position signals 25
display 27
input unit 33
computer 34
image 35
illumination pinhole 39
detection pinhole 41
microscope 50
interface 52
buffer memory 54
image frame 56
comparator 58
switch 60
data manager 64
data structure 66
individual scene 70

What is claimed is:

1. A method for the observation of dynamic processes, comprises the steps of:
   providing a microscope system with a processing unit associated with a detector;
   controlling image capture of said dynamic processes in the microscope system with a computer;
   acquiring and generating a plurality of image frames from a scene periodically;
   processing image frames from a scene generated by the microscope with the computer;
   storing the plurality of acquired image frames of the scene in a buffer memory;
   conveying at least two successive subregions of successive image frames of the scene to a comparator; and
   segmenting of the image frames of the scene into sequences of sub-image frames in accordance with their image content;
   wherein the scene is comprised of a group of image frames acquired repeatedly from the same individual points; and,
   wherein in the case of successive image frames in which almost no change in the image content occurs, a greater compression, by way of coding and blanking of data, is performed prior to transfer to the computer than in successive image frames in which more change occurs.

2. The method as defined in claim 1, wherein the segmenting is performed by a signal processor; and a grouping of the plurality of acquired image frames into scenes is performed by the computer, with simultaneous optional storage of attributes such as acquisition times, spectral detection parameters, and spectral illumination parameters.

3. The method as defined in claim 1, wherein the original data stream is reconstructed in the computer from the transferred compressed data stream.

4. The method as defined in claim 1, wherein a software program which automatically compares the image contents of successive image frames and stores them in a data structure structured as a function of their image content, is provided on the computer.

5. The method as defined in claim 4, wherein the software program automatically displays the nonlinearly structured image contents in suitable fashion on a display, and makes then available to the user for interaction.

6. A microscope system for the observation of dynamic processes, comprising: a microscope having at least one detector, a computer wherein said computer performs a grouping of a plurality of acquired image frames of said dynamic processes into scenes, a buffer memory which precedes a comparator that compares the image contents of at least two successive image frames from said plurality of acquired image frames; and a data structure provided in the buffer memory wherein according to the result obtained from the comparator the image frames are stored in different segments of the buffer memory, wherein each of said scenes comprises a group of image frames acquired over time that include the same individual points; and,
   wherein in the case of successive image frames in which almost no change in the image content occurs, a greater compression, by way of coding and blanking of data, is performed prior to transfer to the computer than in successive image frames in which more change occurs.

7. The method as defined in claim 6, wherein the segments in the data structure of the buffer memory are formed by a processing unit.

8. The microscope system as defined in claim 6, wherein a data manager is provided which performs an evaluation of the acquired image frames in terms of their similarity.

9. The microscope system as defined in claim 6, wherein an interface is provided between the computer and the comparator; and the image frames are directed by means of a switch directly from the buffer memory to the interface; and the result of the comparator is optionally directed via the interface to the computer.

10. The microscope system as defined in claim 9, wherein the result of the comparator is conveyable directly to the computer.

11. A software program is provided on a computer of a microscope system for the observation of dynamic processes, the software program comprises the steps of:
    controlling image capture of dynamic processes in the microscope system;
    processing a plurality of image frames from a scene;
    storing the plurality of acquired image frames from the scene in a buffer memory;
    comparing at least two successive subregions of successive image frames of the scene; and,
    forming segments of the image frames of the scene into sequences of sub-image frames in accordance with their image content;
    wherein said scene is comprised of a group of image frames acquired repeatedly from the same individual points; and, wherein in the case of successive image frames in which almost no change in the image content occurs, a greater compression, by way of coding and blanking of data, is performed prior to transfer to the computer than in successive image frames in which more change occurs.

12. The software program as defined in claim 11 wherein the software program automatically compares the image contents of successive image frames and stores them in a data structure structured as a function of their image content.

13. The software program as defined in claim 11, wherein the software program automatically displays the nonlinearly structured image contents in suitable fashion on a display, and makes then available to the user for interaction.

* * * * *